United States Patent Office 3,397,043
Patented Aug. 13, 1968

3,397,043
SINGLE PHASE TERNARY SEMICONDUCTING COMPOUNDS OF SILVER OR COPPER, THALLIUM, AND SULFUR OR SELENIUM
Donald Paul Spitzer, Riverside, Conn., assignor to American Cyanamid Company, Stamford, Conn., a corporation of Maine
No Drawing. Filed June 1, 1966, Ser. No. 554,302
5 Claims. (Cl. 23—315)

ABSTRACT OF THE DISCLOSURE

Single phase semiconducting compounds of silver or copper, thallium and sulfur or selenium possessing thermal electric properties are provided.

---

The present invention relates to novel ternary semiconducting compositions of matter. More particularly, it relates to novel semiconducting single phase materials which contain three elements, namely, copper or silver, thallium and sulfur or selenium. Still more particularly, the invention is concerned with single phase semiconducting compounds which possess the structure:

MTlD where M is the element silver or copper, Tl is thallium and D is the element sulfur or selenium.

Semiconducting materials which are both binary and ternary are known. They find utility principally in solid state semiconducting devices, such as transistors, rectifiers, photocells, thermoelectric generators and the like. However, such compounds are generally not of a single phase but possess a plurality of phases. Consequently, the thermoelectric properties are rather poor. If single phase crystals could be developed or provided which are of a single phase while maintaining their semiconducting properties, such compounds would fulfill a long-felt need.

It is, therefore, a principal object of the invention to provide ternary semiconducting compounds which are of a single phase. It is a further object of the invention to provide a novel procedure for obtaining ternary crystalline compounds having a single phase. Other objects and advantages will become apparent from a consideration of the ensuing description.

To this end, there is provided semiconducting materials represented by the formula:

MTlD wherein M is the element silver or copper, Tl is thallium and D is the element sulfur or selenium. Unexpectedly, the elements which are admixed in accordance with the process of the present invention produce a crystalline structure which is of a single phase. This is rather surprising because there is no manner in which it can be predicted that any random combination of elements will result in a single phase.

In general, the compounds of the invention which are found to possess good thermal electric properties can be prepared in a straightforward manner. The elements are mixed in the required stoichiometric amounts, introduced into a crucible which is evacuated and sealed and then subjected to elevated temperatures. This is usually done by placing the crucible containing the mixed elements into a furnace and heating the crucible and contents to a temperature above the melting point of the material or composition of matter to be prepared. In general, a temperature of from about 700° C. to about 1100° C. will be required to accomplish this end. Depending on the temperature employed, the time required to fuse the elements commencing at room temperature ranges from about thirty minutes to three hours. For most preparations, a time of about one hour appears to be ample.

The temperatures employed are sufficient as to liquefy the elements present. In this state, the elements are intimately mixed by rocking the crucible-containing furnace. Uniformity of product is thereby achieved. Thereafter, the contents in the crucible are cooled at rates ranging from approximately 2° C. to 20° C. per hour.

As stated previously, the compounds of the present invention are found to be of a single phase. Further, if prepared from a melt of the elements, the compounds appear to be microscopically homogeneous. Further, their melting points have been determined by the well-known differential thermal analysis technique in which sharp thermal peaks are observed. The latter are attributed to the presence of a single phase. Moreover, the resistivity, the Seebeck coefficient and the thermal conductivities were all determined in accordance with the procedures set forth in United States Letters Patent No. 3,211,517, which is incorporated herein by reference.

The following examples are presented merely by way of illustration and are not to be deemed limitative of the present invention.

EXAMPLE 1

The compound AgTlS, which is found to possess a melting point equal to 321° C., is prepared by incorporating equimoles of elemental silver, thallium and sulfur in a crucible of quartz tubing which is inserted in a resistance furnace heated to a temperature of about 900° C. The temperature is maintained for two hours. Thereafter, the furnace is allowed to be cooled to room temperature and the contents in the crucible removed and examined microscopically as well as by X-ray analysis. Single phase compound, AgTlS, is found to possess a resistivity of $3 \times 10^{+6}$ ohm-centimeter, a Seebeck coefficient of 2500 microvolts/° C. and a thermal conductivity of 0.0045 watt/centimeter ° C.

EXAMPLE 2

Repeating the procedure of Example 1 in every detail except that selenium is substituted for sulfur, a homogeneous single phase crystalline compound is obtained which has a resistivity of $1 \times 10^{+4}$ ohm-centimeter, a Seeback coefficient of 1230 and a thermal conductivity equal to 0.0040 watt/centimeter ° C. The melting point of the compound: AgTlSe, as determined by a differential thermal analysis technique, is found to be 415° C.

EXAMPLE 3

The procedure of Example 1 is repeated in every detail except that the single phase compound CuTlS which possesses a melting point equal to 413° C., as determined by a differential thermal analysis technique, is prepared by reacting equimolar amounts of copper, thallium and sulfur. The resultant product possesses a resistivity of 0.038 ohm-centimeter, a Seebeck coefficient of 295 microvolts/° C. and a thermal conductivity of 0.0090 watt/centimeter ° C.

EXAMPLE 4

The compound CuTlSe, is prepared by repeating the procedure of Example 3 in every detail except that selenium is substituted for elemental sulfur. The resultant compound is found upon X-ray analysis to be of a single phase having a melting point equal to 430° C. as determined by differential thermal analysis technique, a resistivity of 0.071 ohm-centimeter, a Seebeck coefficient of 355 microvolts/° C. and a thermal conductivity of 0.0044 watt/centimeter ° C.

Advantageously, the compounds of the invention possess a relatively high resistivity, particularly those compounds represented by the formula AgTlS or AgTlSe. The unexpectedly high resistivity of either the silver thallium sulfide or the silver thallium selenide compound renders the latter compounds highly useful in a photoconductor device.

I claim:

1. A semiconducting, single phase compound of matter having the formula:

MTlD wherein M is an element selected from the group consisting of silver and copper, Tl is thallium and D is an element selected from the group consisting of sulfur and selenium.

2. The compound according to claim 1 wherein M is silver and D is sulfur.

3. The compound according to claim 1 wherein M is silver and D is selenium.

4. The compound according to claim 1 wherein M is copper and D is sulfur.

5. The compound according to claim 1 wherein M is copper and D is selenium.

References Cited

UNITED STATES PATENTS

| | | | |
|---|---|---|---|
| 2,814,004 | 11/1957 | Goodman | 23—315 |
| 2,944,975 | 7/1960 | Folberth | 23—204 |
| 3,245,931 | 11/1967 | Hulliger | 23—315 |

OSCAR R. VERTIZ, *Primary Examiner.*

H. S. MILLER, *Assistant Examiner.*